United States Patent
Hicks et al.

(10) Patent No.: US 11,838,189 B1
(45) Date of Patent: Dec. 5, 2023

(54) CREATING A BUDGET-BASED TIME SERIES

(71) Applicant: SPLUNK Inc., San Francisco, CA (US)

(72) Inventors: Jeremy Hicks, Ellsworth, ME (US); Todd Leonard DeCapua, Wilmington, DE (US); Adam James Schalock, Beaverton, OR (US); Neil Douglas Erkkila, Cherry Valley, MA (US); Samuel Halpern, Chicago, IL (US); Chad Tripod, Livermore, CA (US); Joel Schoenberg, Vashon, WA (US); David Connett, Lake Orion, MI (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 17/976,453

(22) Filed: Oct. 28, 2022

(51) Int. Cl.
*G06F 15/173* (2006.01)
*H04L 41/5009* (2022.01)
*H04L 43/045* (2022.01)
*H04L 41/5025* (2022.01)

(52) U.S. Cl.
CPC ...... *H04L 41/5016* (2013.01); *H04L 41/5025* (2013.01); *H04L 43/045* (2013.01)

(58) Field of Classification Search
CPC ............. H04L 41/5016; H04L 41/5025; H04L 43/045
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 11,609,678 B2 * | 3/2023 | Johnston | G06F 3/04817 |
| 11,609,969 B2 * | 3/2023 | Shingaki | G05B 19/41885 |

(Continued)

FOREIGN PATENT DOCUMENTS

EP    3936957 A1 *  1/2022  ............. F03D 17/00

OTHER PUBLICATIONS

Splunk Enterprise 8.0.0 Overview, available online, retrieved May 20, 2020 from docs.splunk.com.

(Continued)

*Primary Examiner* — Richard G Keehn
(74) *Attorney, Agent, or Firm* — KILPATRICK TOWNSEND & STOCKTON LLP

(57) ABSTRACT

A time series is created that measures a remaining budget amount for a given time period, where the budget amount indicates a maximum number of occurrences of an event allowed for the given time period. More specifically, the given time period is divided into multiple time intervals. For each time interval, a number of occurrences of the event are calculated and detracted from the remaining budget amount to determine a remaining budget amount at the end of the time interval. These time values and associated remaining budget amounts are used to create the time series. This time series may be monitored in real-time, and actions may be taken to avoid future occurrences of the event in response to determining that the remaining budget amount falls below a threshold.

20 Claims, 6 Drawing Sheets

(56) References Cited

U.S. PATENT DOCUMENTS

| | | | |
|---|---|---|---|
| 11,610,441 B1* | 3/2023 | Bernico | G06Q 40/08 |
| 11,611,616 B1* | 3/2023 | Gabrielson | H04L 67/1095 |
| 2019/0098106 A1 | 3/2019 | Mungel et al. | |
| 2020/0313979 A1* | 10/2020 | Kumaran | H04L 41/16 |
| 2021/0250262 A1* | 8/2021 | Ghouse Mohaddin | H04L 43/08 |
| 2021/0406112 A1* | 12/2021 | Moss | G06F 11/0751 |
| 2022/0011766 A1* | 1/2022 | Ajmera | G05B 23/0283 |
| 2023/0020832 A1* | 1/2023 | Hotchkiss | H04L 41/12 |
| 2023/0021600 A1* | 1/2023 | Singer | H04L 41/069 |
| 2023/0050179 A1* | 2/2023 | Ishii | A61B 5/02125 |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

\* cited by examiner

CREATING A BUDGET-BASED TIME SERIES

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

Services provided by these data systems are often governed by budgets such as service level objectives (SLOs), service level agreements (SLAs), etc. Effectively managing these data systems in view of existing budgets presents technical challenges.

BRIEF DESCRIPTION OF THE DRAWINGS

Illustrative examples are described in detail below with reference to the following figures.

DETAILED DESCRIPTION

Figure 1:
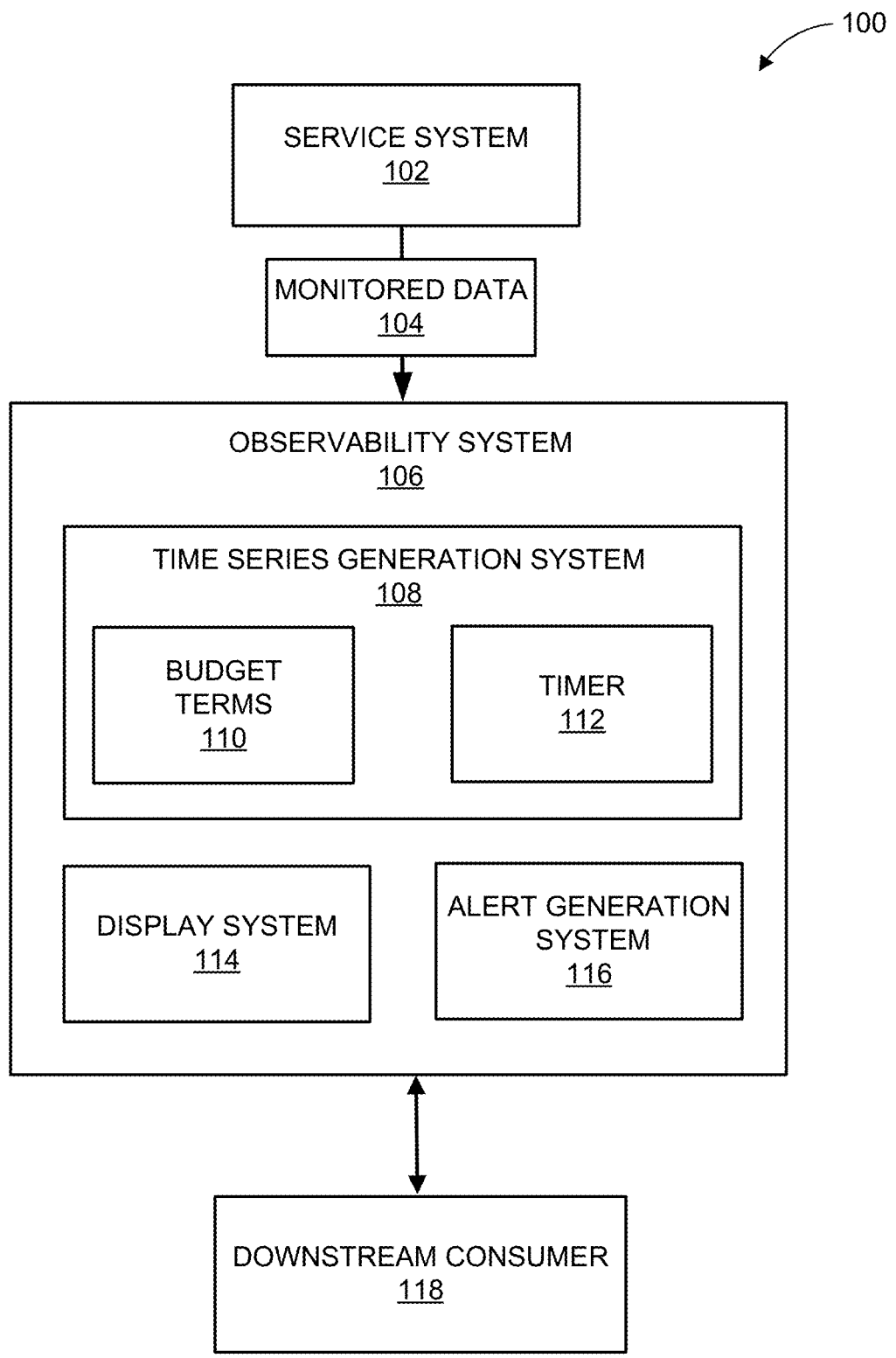
FIG. 1 is a block diagram of an environment for creating a time series illustrating a remaining budget amount, according to at least one implementation.

An observability system (such as the observability system 106 of FIG. 1, the observability system 601 of FIG. 6, etc.) can offer a unified environment to monitor infrastructure, applications, and supporting services in real-time, in a single pane of glass. The platform can integrate with common data sources to get data from on-premise and cloud infrastructure, applications and services, and user interfaces into the observability system.

In certain implementations, when data is sent from each layer of a full-stack environment to the observability system, the observability system can transform raw metrics, traces, and logs into actionable insights in the form of dashboards, visualizations, alerts, and more. The features of the observability system can enable users to quickly and intelligently respond to outages and identify root causes, while also giving users the data-driven guidance needed to optimize performance and productivity.

Additionally, in certain implementations the observability system can receive data from a user's environment using supported integrations to common data sources. The observability system can offer insights into infrastructure as well as the ability to perform powerful, capable analytics infrastructure and resources across hybrid and multi-cloud environments. Infrastructure monitoring offers support for a broad range of integrations for collecting all kinds of data, from system metrics for infrastructure components to custom data from applications.

Further, in certain implementations the observability system can collect traces and spans to monitor distributed applications. A trace is a collection of actions, or spans, that occur to complete a transaction. The observability system can collect and analyze every span and trace from each of the services connected to the observability system to give users full-fidelity access to all of their application data.

Further still, in certain implementations the observability system can provide insights about the performance and health of a front-end user experience of one or more applications. The observability system can collect performance metrics, web vitals, errors, and other forms of data to enable users to detect and troubleshoot problems in their application, measure the health of their application, and assess the performance of their user experience.

Also, in certain implementations the observability system can also synthetically measure the performance of web-based properties. The observability system can offer features that provide insights that enable users to optimize uptime and performance of application programming interfaces (APIs), service endpoints, and end user experiences and prevent web performance issues.

In addition, in certain implementations the observability system can troubleshoot applications and infrastructure behavior using high-context logs. Users can perform code-less queries on logs to detect the source of problems in their systems. Users can also extract fields from logs to set up log processing rules and transform their data as it arrives.

Furthermore, in certain implementations the observability system includes incident response software that aligns log management, monitoring, chat tools, and more for a single pane of glass into system health. The observability system can automate delivery of alerts to get the right alert, to the right user, at the right time.

The ability to monitor the performance of a service (such as website provisioning, resource implementation, etc.) is valuable to one or more providers of the service, one or more customers paying for the service, and one or more consumers of such service. Many service providers enter into service level agreements (SLAs) with customers, where the SLAs detail budgets associated with such service (such as an allowable downtime percentage, etc.). Penalties may be incurred by the service provider if these SLAs are not met (e.g., if budgets are exceeded).

To address this issue, a time series is created (e.g., by an observability system, etc.), where the time series measures a remaining budget amount for a given time period, where the budget amount indicates a maximum number of occurrences of an event allowed for the given time period. More specifically, the given time period is divided into multiple time intervals. For each time interval, a number of occurrences of the event are calculated and detracted from the remaining budget amount to determine a remaining budget amount at the end of the time interval. These time values and associated remaining budget amounts are used to create the time series. This time series may be monitored in real-time, and actions may be taken to avoid future occurrences of the event in response to determining that the remaining budget amount falls below a threshold.

FIG. 1 illustrates an environment 100 for creating a time series illustrating a remaining budget amount. As shown, monitored data 104 is sent from a service system 102 to an observability system 106. In one implementation, the service system 102 may include a system that provides a service by performing one or more actions. In another implementation, these actions may be associated with a predetermined budget. For example, the service system 102 may host/implement a website, where the website has a service level objective (SLO) budget. In yet another implementation, the service system 102 may be one of a plurality of distributed computing devices. For example, the service system may be included within a distributed system such as a cloud computing system, a multi-tenant architecture, etc.

Additionally, in one implementation, the monitored data 104 may include details about the service being implemented by the service system 102. For example, the monitored data 104 may include one or more spans that describe traffic associated with a website being hosted by the service system 102. A span may represent an individual unit of work done by the service device. In another implementation, the monitored data 104 may be sent by a monitoring agent installed within the service system 102. In yet another implementation, the observability system 106 may include a system that creates, analyzes, and manages time series metrics. For example, the observability system may include all or a portion of the observability system 601 of FIG. 6.

Figure 4:
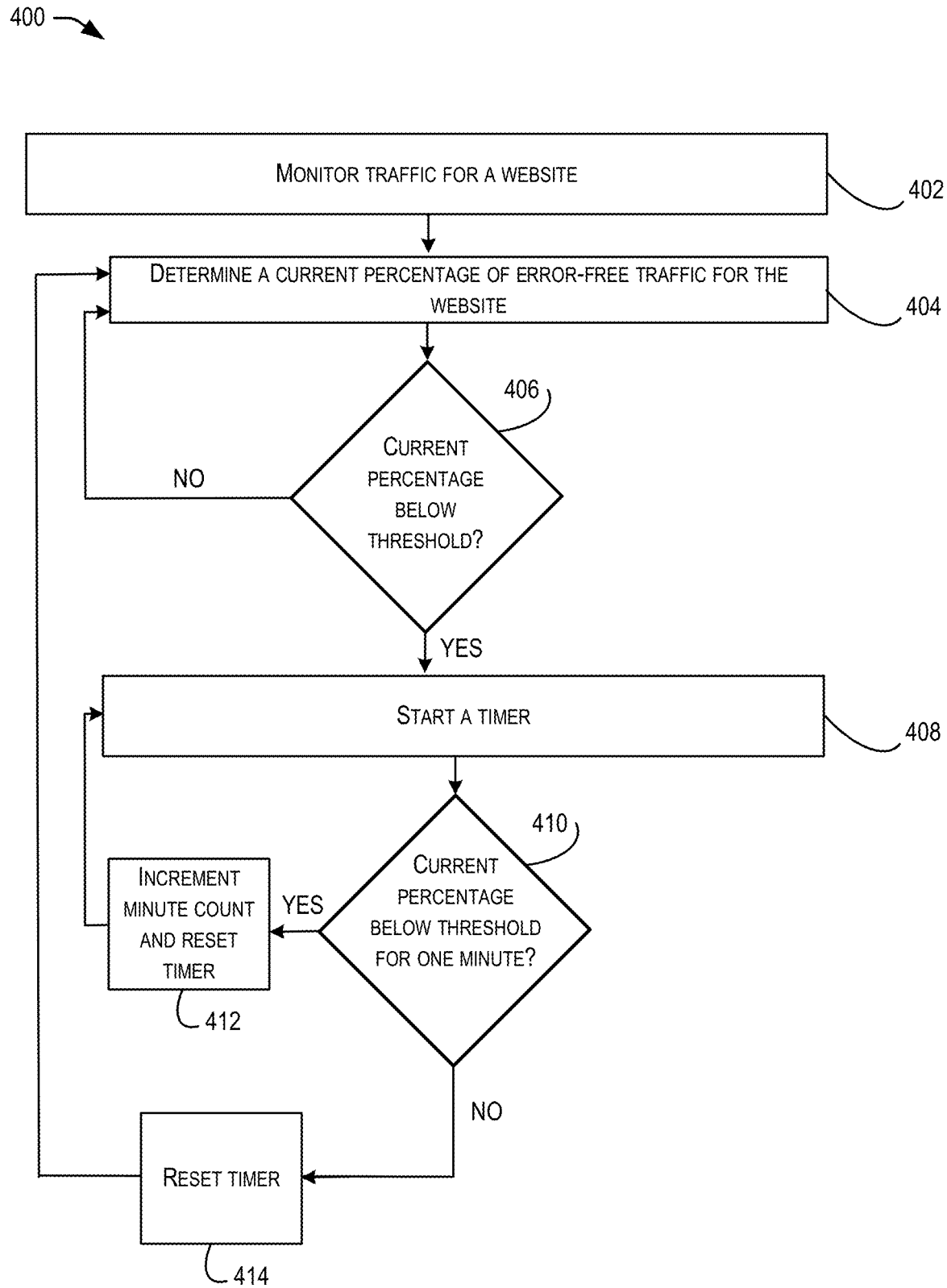
FIG. 4 illustrates an example method for determining a number of minutes during a time interval where a success rate for a website drops below a threshold, according to at least one implementation.

Further, a time series generation system 108 within the observability system 106 creates a time series based on the monitored data 104, predetermined budget terms 110, and a timer 112. For example, the time series generation system 108 may use the timer 112 and the monitored data 104 to determine, for each of a plurality of time intervals, a number of minutes where a success rate for a website drops below a threshold. One example of how this calculation is performed is illustrated in FIG. 4.

Figure 3:
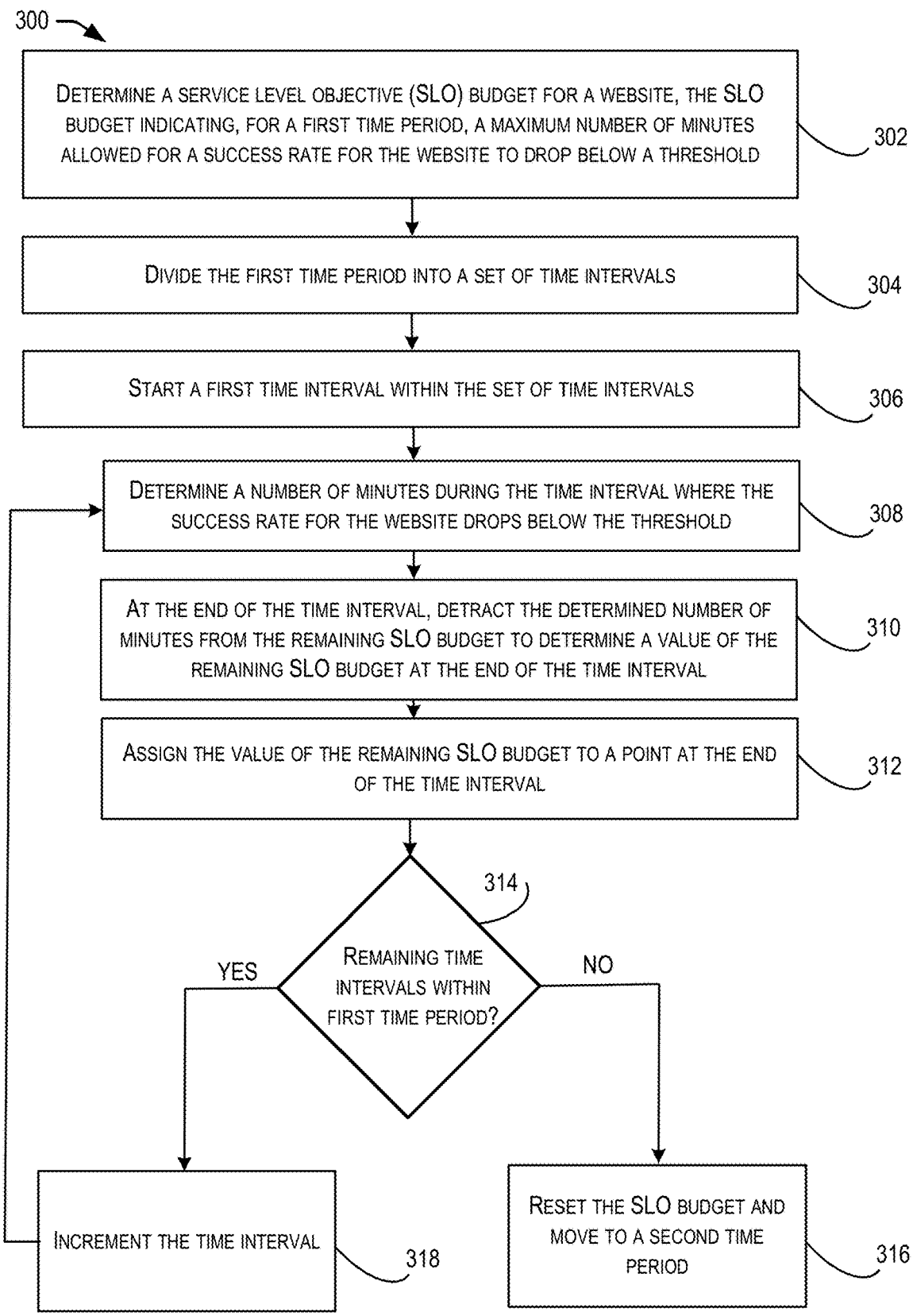
FIG. 3 illustrates an example method for creating a time series based on a service level objective (SLO) budget for a website, according to at least one implementation.

Further still, these determined minutes may be detracted from a budgeted number of minutes indicated by the budget terms 110 to determine a remaining budget amount at each of a set of time intervals for a predetermined time period. The remaining budget amount at each time interval may then be used by the observability system to create a time series One example of such time series creation is shown in FIG. 3.

Figure 5:
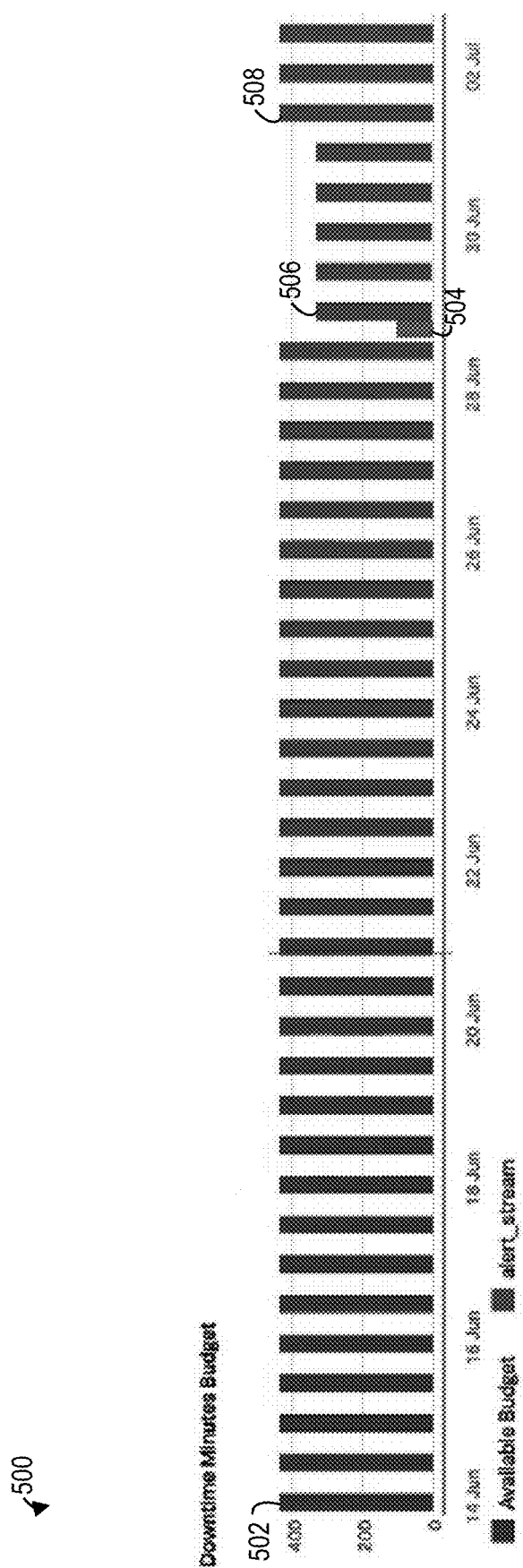
FIG. 5 illustrates an example graphical representation of a time series indicating a remaining downtime minutes budget for a website, according to at least one implementation.

Also, the determined time series may be presented by a display system 114 of the observability system 106. One example of such a display is shown in FIG. 5. One or more alerts may also be generated based on the time series, utilizing an alert generation system 116 the observability system 106. Examples of such alert generation are shown in step 208 of FIG. 2.

In addition, the time series or other information associated with the time series (such as alert information, display information, etc.) may be passed to a downstream consumer 118 for additional processing. For example, the downstream consumer 118 may store the received time series, index the received time series, etc.

In some environments, a user of an observability system 106 may install and configure, on computing devices owned and operated by the user, one or more software applications that implement some or all of the components of the observability system 106. For example, with reference to FIG. 1, a user may install a software application on the service system 102 owned by the user and configure each server to operate as one or more components of the observability system 106. This arrangement generally may be referred to as an "on-premises" solution. That is, the observability system 106 can be installed and can operate on computing devices directly controlled by the user of the observability system 106. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of observability system 106 operate.

In certain implementations, one or more of the components of the observability system 106 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a observability system 106 by managing computing resources configured to implement various aspects of the system (e.g., the time series generation system 108, the display system 114, the alert generation system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the observability system 106 execute can be shared by multiple customers or tenants as part of the shared computing resource environment. In addition, when implemented in a shared computing resource environment as a cloud-based service, various components of the observability system 106 can be implemented using containerization or operating-system-level virtualization, or other virtualization techniques. For example, one or more components of the time series generation system 108, the display system 114, the alert generation system 116, etc. can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the observability system 106 in a shared computing resource environment can provide a number of benefits. In some cases, implementing the observability system 106 in a shared computing resource environment can make it easier to install, maintain, and update the components of the observability system 106. For example, rather than accessing designated hardware at a particular location to install or provide a component of the observability system 106, a component can be remotely instantiated or updated as desired. Similarly, implementing the observability system 106 in a shared computing resource environment or as a cloud-based service can make it easier to meet dynamic demand. For example, if the observability system 106 experiences significant load at indexing or search, additional compute resources can be deployed to process the additional data or queries. In an "on-premises" environment, this type of flexibility and scalability may not be possible or feasible.

In addition, by implementing the observability system 106 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the observability system 106 and/or to other systems unrelated to the observability system 106.

As mentioned, in an on-premises environment, data from one instance of an observability system 106 is logically and physically separated from the data of another instance of an observability system 106 by virtue of each instance having its own designated hardware. As such, data from different customers of the observability system 106 is logically and physically separated from each other. In a shared computing resource environment, components of an observability system 106 can be configured to process the data from one customer or tenant or from multiple customers or tenants. Even in cases where a separate component of an observability system 106 is used for each customer, the underlying hardware on which the components of the observability system 106 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the observability system 106 can maintain logical separation between tenant data. For example, the observability system 106 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customers A's hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the observability system 106 can maintain the mutual exclusivity and/or independence between tenant data even as the tenant data is being processed, stored, and searched by the same underlying hardware. In certain cases, to maintain the mutual exclusivity and/or independence between the data of different tenants, the observability system 106 can use tenant identifiers to uniquely identify data associated with different tenants.

In a shared computing resource environment, some components of the observability system 106 can be instantiated and designated for individual tenants and other components can be shared by multiple tenants. In certain implementations, the time series generation system 108, the display system 114, the alert generation system 116, etc. can be instantiated for each tenant or shared by multiple tenants. In some such implementations where components are shared by multiple tenants, the components can maintain separate directories for the different tenants to ensure their mutual exclusivity and/or independence from each other. Similarly, in some such implementations, the observability system 106 can use different hosting computing systems or different isolated execution environments to process the data from the different tenants as part of the time series generation system 108, the display system 114, the alert generation system 116, etc.

In some implementations, individual components of the time series generation system 108, the display system 114, the alert generation system 116, etc. may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In some cases, by sharing more components with different tenants, the functioning of the observability system 106 can be improved. For example, by sharing components across tenants, the observability system 106 can improve resource utilization, thereby reducing an amount of resources allocated as a whole.

Figure 2:
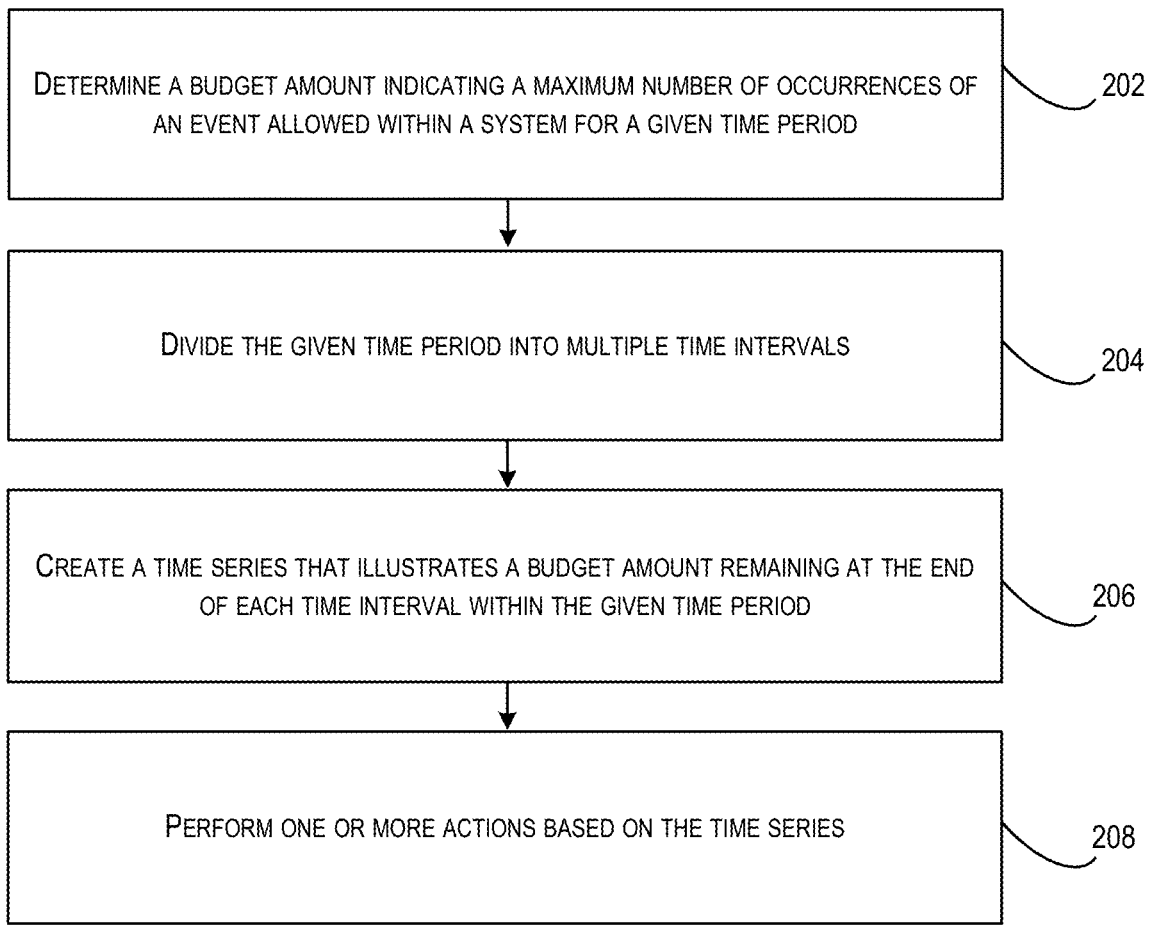
FIG. 2 illustrates an example method for creating a budget-based time series, according to at least one implementation.

FIG. 2 illustrates an example method 200 for creating a budget-based time series, according to at least one implementation. The method 200 may be performed by one or more components of FIGS. 1 and 6. A computer-readable storage medium comprising computer-readable instructions that, upon execution by one or more processors of a computing device, cause the computing device to perform the method 200. The method 200 may be performed in any suitable order. It should be appreciated that the method 200 may include a greater number or a lesser number of steps than that depicted in FIG. 2.

The method 200 may begin at 202, where a budget amount is determined that indicates a maximum number of occurrences of an event allowed within a system for a given time period. In one implementation, the budget amount may indicate a predetermined number of instances where a website has a success rate below a predetermined percentage for a predetermined amount of time (e.g., one minute, etc.). In another implementation, the budget amount may indicate a predetermined number of instances where data storage has a utilization above a predetermined percentage. In another implementation, the budget amount may be calculated based on a contracted rate for the given time period.

For example, the contracted rate may include a website hosting service that requires website availability with a 99% success rate (a 1% error rate) for the website over a month's time period. In another example, the contracted rate may include an error budget that indicates an allocated number of error minutes within the month time period. In yet another example, the error budget may be calculated in terms of minutes by multiplying the error rate (0.01) by the number of days in a given month (e.g., 30) and by the number of minutes in a day (1440 minutes) to arrive at an error budget of (0.01)*(30)*(1440)=432 minutes.

Further, in one implementation, the budget amount may be part of a service level objective (SLO), a service level agreement (SLA), etc. In another implementation, the system may include a cloud computing environment, a multi-tenant environment, etc. In yet another implementation, the system may provide a service (e.g., a website hosting service) for which the budget amount is applied.

Further still, at 204, the given time period is divided into multiple time intervals. In one implementation, each of the predetermined time intervals may have the same length. For example, a given time period of thirty days may be divided into one-hour time intervals, twelve-hour time intervals, one-day time intervals, etc.

Also, in one implementation, a length of each of the time intervals may be determined based on historical data. For example, a plurality of historical time series created for the same or a similar budget may be identified. In another example, these historical time series may be analyzed to determine the time interval to be used to divide the given time period. In yet another example, an average time period used for the historical time series may be selected as the time interval used to divide the current given time period.

In addition, at 206, a time series is created that illustrates a budget amount remaining at the end of each time interval within the given time period. In one implementation, during each of the plurality of time intervals, monitoring may be performed to identify occurrences of the event. In another implementation, the monitoring may be performed by receiving an input metric time series stream. For example, the input metric time series stream may include one or more metrics associated with the event.

For instance, the metric may include a success rate of a website at a predetermined time, a utilization of a processor at a predetermined time, a utilization of data storage at a predetermined time, etc. In one implementation, the input metric time series may indicate a measurement of a predetermined metric at a predetermined time.

Furthermore, in one implementation, during each time interval, values for the input metric within the input time series may be compared to a threshold to determine an event count indicating a number of occurrences of the event within the system during the time interval. For example, if the metric is a success rate of a website, each time the success rate falls below a predetermined percentage (e.g., 99%), a timer may be started. In another example, each instance of the event may include an instance of time (e.g., one minute) during which the website has a success rate below the predetermined percentage.

Further still, in one example, in response to detecting an instance of the event during a time interval, an event count may be incremented for the time interval and the timer may be reset and restarted. In another example, the timer may be stopped in response to determining that the success rate indicated within the first time series meets or exceeds the predetermined percentage. In this way, for each predetermined time interval, an event count for the time interval may indicate a number of minutes where the website had a success rate below the predetermined percentage.

Also, in one implementation, a remaining budget time series may be created utilizing the event count for each interval within the given time period. For example, a value for the event count at the end of each time interval may be determined. In another example, for each time interval, the event count for the time interval may be detracted from a remaining allocated budget amount to determine a remaining budget amount at the end of the time interval.

Additionally, in one implementation, the remaining budget time series may indicate a value for the remaining budget amount at the end of each time interval within the given time period. For example, the allocated budget amount may indicate a number of minutes per month where a website has a success rate below a predetermined percentage. In another example, for a thirty-day month, the allocated budget amount may be set at 432 minutes. The time intervals may be set at one day increments (e.g., such that there are thirty one-day increments for a thirty-day time period), and the website may have a success rate below the predetermined percentage for ten minutes during the first one-day interval. This may result in an event count of ten for the first one-day interval.

Further, in one example, this even count (ten minutes) may be detracted from the allocated budget amount (432 minutes) to determine a remaining budget amount (422 minutes) at the end of the first one-day time interval. In another example, a first point with a time value of t=1 and a remaining budget value of 422 minutes may be added to the remaining budget time series. In another example, the website may have a success rate below the predetermined percentage for five minutes during the second one-day interval. This may result in a count of five for the second one-day interval. This count (five minutes) may be detracted from the remaining budget amount (422 minutes) to determine a remaining budget amount (417 minutes) for the second one-day time interval. In yet another example, a second point with a time value of t=2 and a remaining budget value of 417 minutes may be added to the remaining budget time series.

Further still, at 208, one or more actions are performed based on the time series. In one implementation, one or more alerts may be issued based on the remaining budget time series. For example, an alert may be issued in response to determining that a remaining budget amount indicated within the remaining budget time series falls below a predetermined threshold. In another implementation, an alert may be issued in response to determining that the remaining budget amount indicated within the remaining budget time series is above a predetermined threshold with a predetermined amount of time remaining within the given time period.

Also, in one implementation, the alert may include one or more emails indicating that the remaining budget amount has fallen below a predetermined threshold. In another implementation, in response to an alert, one or more predetermined actions (such as update implementations, testing routines, etc.) may be automatically implemented within the system. For example, a testing routine may manipulate one or more predetermined aspects of the implementation of the website within the system providing the hosting of the website. In another example, implementing updates within the system may install one or more updated versions of software within the system, and may restart one or more portions of the system.

These predetermined actions may result in an increased number of occurrences of the event within the system. For example, implementing updates or testing routines within the system may result in a decreased success rate for the website hosted by the system, which may result in an increased number of minutes where the website has a success rate below a predetermined percentage.

In another example, the predetermined actions may be stopped in response to determining that the remaining budget amount indicated within the remaining budget time series falls below the predetermined threshold. In another implementation, the remaining budget time series may be presented graphically utilizing an interface (such as a graphical user interface (GUI), etc.).

In this way, a first time series related to system data may be transformed into a second time series that tracks a remaining budget amount for one or more metrics associated with that system data. This second time series can be monitored, and results of the monitoring can be used to proactively perform one or more actions within the system to improve a performance of the system (e.g., by implementing system updates or performing system testing) without exceeding the remaining budget amount.

FIG. 3 illustrates an example method 300 for creating a time series based on a service level objective (SLO) budget for a website, according to at least one implementation. The method 300 may be performed by one or more components of FIGS. 1 and 6. A computer-readable storage medium comprising computer-readable instructions that, upon execution by one or more processors of a computing device, cause the computing device to perform the method 300. The method 300 may be performed in any suitable order. It should be appreciated that the method 300 may include a greater number or a lesser number of steps than that depicted in FIG. 3.

The method 300 may begin at 302, where a service level objective (SLO) budget is determined for a website, where the SLO budget indicates, for a first time period, a maximum number of minutes allowed for a success rate for the website to drop below a threshold. In one implementation, the website may be hosted by a system (such as a cloud-based system, a multi-tenant system, etc.).

Additionally, at 304, the first time period is divided into a set of time intervals. In one implementation, a duration and number of these time intervals may be determined utilizing historical time intervals for similar SLO budgets, similar time series, similar customers, etc.

Further, at 306, a first time interval is started within the set of time intervals. At 308, a number of minutes is determined during the time interval where the success rate for the website drops below the threshold. In one implementation, the number of minutes may be determined utilizing an input metric time series stream. One example of performing this minute determination is shown in FIG. 4.

Further still, at 310, at the end of the time interval, the determined number of minutes are detracted from the remaining SLO budget to determine a value of the remaining SLO budget at the end of the time interval. As shown in operation 312, the value of the remaining SLO budget is assigned to a point at the end of the time interval.

Also, at decision 314, it is determined whether one or more time intervals remain within the first time period. In response to determining in decision 314 that no time intervals remain within the first time period, at 316 the SLO budget is reset, and the method 300 moves to a second time period.

In addition, in response to determining in decision 314 that one or more time intervals remain within the first time period, at 318 the time interval is incremented and the method proceeds to 308 with the incremented time interval.

In this way, a time series may be created that describes a remaining SLO budget at each of a set of time intervals for a predetermined time period. One or more actions may also be performed based on this time series (see, for example, step 208 of FIG. 2).

FIG. 4 illustrates an example method 400 for determining a number of minutes during a time interval where a success rate for a website drops below a threshold, according to at least one implementation. The method 400 may be performed by one or more components of FIGS. 1 and 6. A computer-readable storage medium comprising computer-readable instructions that, upon execution by one or more processors of a computing device, cause the computing device to perform the method 400. The method 400 may be performed in any suitable order. It should be appreciated that the method 400 may include a greater number or a lesser number of steps than that depicted in FIG. 4.

The method 400 may begin at 402, where traffic for a website is monitored. In one implementation, the traffic may be included in a set of spans sent by a system implementing the website. A span may represent an individual unit of work done in a distributed system. For example, the spans may include data obtained and reported by a monitoring agent installed on one or more systems implementing (e.g., hosting, etc.) the website.

Additionally, at 404, a current percentage of error-free traffic is determined for the website. In one implementation, the current percentage of error-free traffic may be determined by dividing an amount of successful traffic by a total amount of traffic. The current percentage of error-free traffic may be determined for a predetermined time period (e.g., a subset of a time interval determined in step 304 of FIG. 3, etc.).

Further, at decision 406, it is determined whether the current percentage of error-free traffic is below a predetermined threshold. If it is determined in decision 406 that the current percentage of error-free traffic is not below a predetermined threshold, then the method again determines the current percentage of error-free traffic in operation 404. If it is determined in decision 406 that the current percentage of error-free traffic is below a predetermined threshold, then at 408 a timer is started.

Further still, at decision 410, it is determined whether the current percentage of error-free traffic is below the threshold for one minute. If it is determined in decision 410 that the current percentage of error-free traffic is below the threshold for one minute, then at 412 a minute count is incremented for the current time interval, and the timer is again started at 408.

Also, if it is determined in decision 410 that the current percentage of error-free traffic is not below the threshold for one minute, then at 414 the timer is reset and the current percentage of error-free traffic is determined again at 404.

In this way, a count may be determined during a time interval, where the count indicates a number of minutes where a success rate for a website drops below a threshold.

FIG. 5 illustrates a graphical representation of a time series 500 indicating a remaining downtime minutes budget for a website. As shown, the time series 500 starts at a first point that indicates a starting total downtime minutes budget 502. In response to the generation of an alert 504 indicating that a percentage of error-free traffic for the website is below a predetermined threshold, a minute count is calculated and detracted from the starting total downtime minutes budget 502 to obtain an updated downtime minutes budget 506. At the end of a given time period, the remaining downtime minutes budget is reset to obtain the starting total downtime minutes budget 508 for the next time period.

Figure 6:
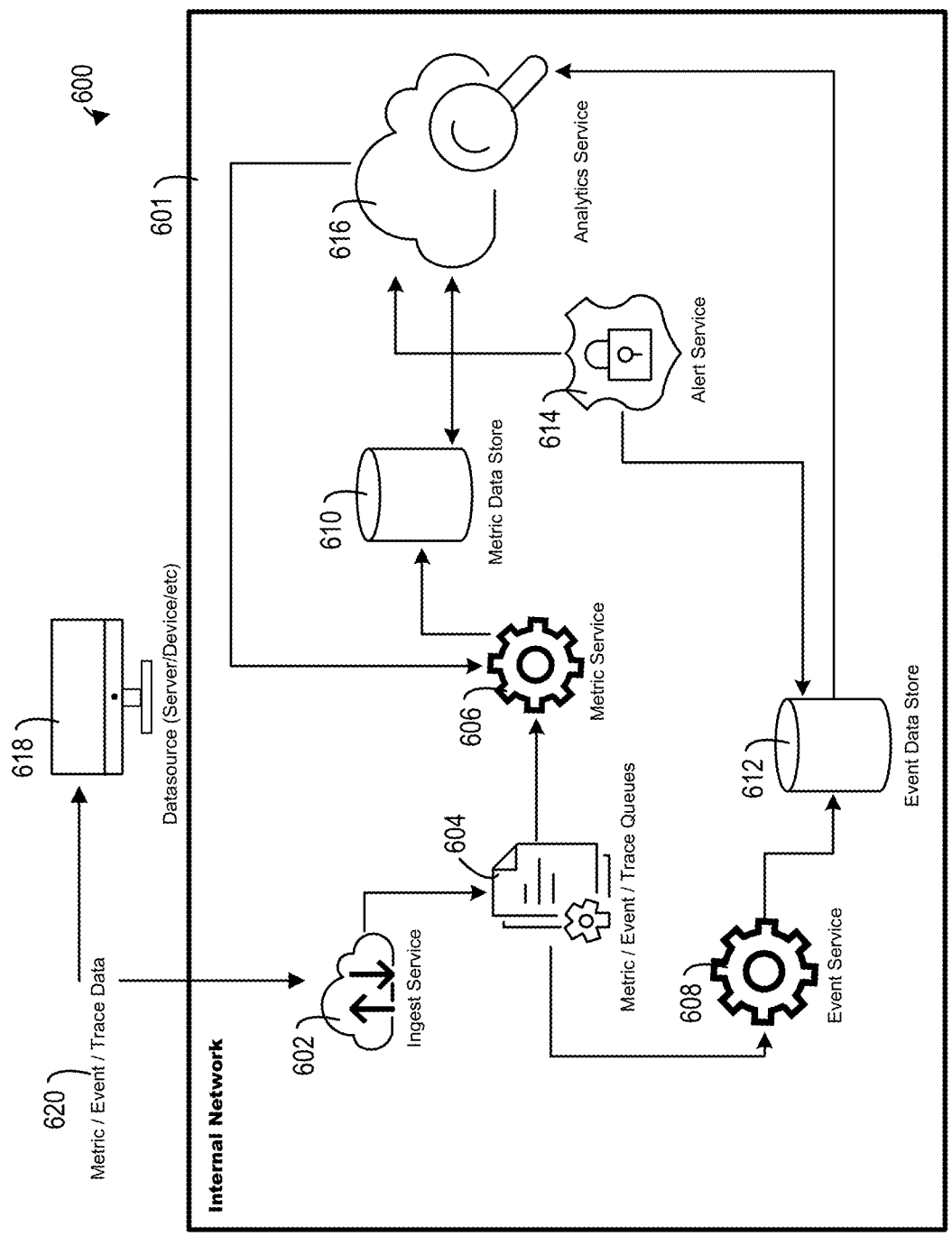
FIG. 6 is a block diagram of an observability environment, according to at least one implementation.

FIG. 6 is a block diagram of an implementation of an observability environment 600. In the illustrated implementation, the observability environment 600 includes an observability system 601 with an ingest service 602, a metric/event/trace data queue 604, a metric service 606, an event service 608, a metric data store 610 and an event data store 612, an alert service 614, and an analytics service 616.

The ingest service 602, the metric/event/trace data queue 604, the metric service 606, the event service 608, the metric data store 610 and the event data store 612, the alert service 614, and the analytics service 616 can communicate with each other via one or more internal networks (e.g., networks internal to the observability system 601), such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 6, it will be understood that a data source 618 can communicate with the observability system 601 via one or more networks.

In some implementations, metric/event/trace data 620 may be received from a data source 618 via the ingest service 602. For example, one or more monitoring agents may be deployed within the data source 618, where such monitoring agents identify, retrieve, and/or compile the metric/event/trace data 620. In another example, the metric/event/trace data 620 may be sent from the data source 618 (e.g., by one or more monitoring agents within the data source 618) to the ingest service 602, utilizing an application programming interface (API) installed within the observability system 601.

Additionally, after being received by the ingest service 602, the metric/event/trace data 620 may be stored in a metric/event/trace data queue 604. The metric/event/trace data queue 604 may include one or more hardware storage components used to store the metric/event/trace data 620. The metric/event/trace data queue 604 may implement one or more predetermined storage methods (such as a first in, first out (FIFO) storage method, etc.).

Further, the metric/event/trace data 620 may be sent from the metric/event/trace data queue 604 to the metric service 606 for processing. In some implementations, the metric service 606 may create one or more time series metrics, utilizing the metric/event/trace data 620. These time series metrics may be stored in the metric data store 610. Further still, the metric/event/trace data 620 may be sent from the metric/event/trace data queue 604 to the event service 608 for processing. In some implementations, the event service 608 may create one or more events, utilizing the metric/event/trace data 620. These events may be stored in the event data store 612.

Also, the analytics service 616 may retrieve time series metrics from the metric data store 610, and may retrieve events from the event data store 612. In some implementations, the time series metrics and the events may be retrieve by the analytics service 616 utilizing one or more mathematical functions, one or more filtering functions, etc. These time series metrics and events may be processed by the analytics service 616 to produce result data. This result data may be stored, used to create visualization data for display, etc.

In addition, the alert service 614 may retrieve the result data from the analytics service 616. The alert service may compare this result data against one or more alerting rules to determine one or more matches. If match criteria are determined (e.g., one or more matches with the result data are determined, the result data exceeds one or more thresholds, etc.), the alert service 614 may create one or more events that are sent to one or more entities (e.g., users, etc.), stored in the event data store 612, etc.

In this way, the observability system 601 may retrieve, sort, and analyze input metric/event/trace data 620. Results of the analysis may include alerts that are presented to one or more users as well as visualization data that may be presented via one or more displays.

Computer programs typically comprise one or more instructions set at various times in various memory devices of a computing device, which, when read and executed by at least one processor, will cause a computing device to execute functions involving the disclosed techniques. In some implementations, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain implementations require at least one of X, at least one of Y and at least one of Z to each be present. Further, use of the phrase "at least one of X, Y or Z" as used in general is to convey that an item, term, etc. may be either X, Y or Z, or any combination thereof.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Implementations are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   determining, by a computer system, a budget amount indicating a maximum number of occurrences of an event allowed within a system for a given time period;
   dividing, by the computer system, the given time period into a plurality of time intervals;
   determining, by the computer system, a number of occurrences of the event for individual ones of the plurality of time intervals;
   determining, by the computer system, a remaining budget amount at an end of the individual ones of the plurality of time intervals;
   creating, by the computer system, a time series that illustrates the remaining budget amount at the end of the individual ones of the plurality of time intervals; and
   performing, by the computer system, one or more actions based on the time series.

2. The computer-implemented method of claim 1, wherein the event includes a website having a success rate below a predetermined percentage for a predetermined time.

3. The computer-implemented method of claim 1, wherein determining the budget amount includes calculating, by the computer system, the budget amount based on a contracted rate for the given time period that is indicated within a service level objective (SLO).

4. The computer-implemented method of claim 1, wherein each of the plurality of time intervals has a length.

5. The computer-implemented method of claim 1, comprising determining, by the computer system, a length of each of the plurality of time intervals based on historical data.

6. The computer-implemented method of claim 1, comprising, during each of the plurality of time intervals:
   receiving, by the computer system, a stream for an input metric;
   comparing, by the computer system, values for the input metric to a threshold to determine an event count indicating a number of occurrences of the event within the system during the time interval; and
   creating, by the computer system, the time series utilizing the event count for each interval within the given time period.

7. The computer-implemented method of claim 1, wherein the time series indicates a value for a remaining budget amount at an end of each time interval within the given time period.

8. The computer-implemented method of claim 1, comprising issuing, by the computer system, one or more alerts based on the time series.

9. The computer-implemented method of claim 1, comprising automatically implementing, by the computer system, one or more testing routines within the system based on the time series.

10. The computer-implemented method of claim 1, comprising automatically implementing, by the computer system, one or more updates to the system based on the time series.

11. A computer system comprising:
one or more processors configured to:
determine a budget amount indicating a maximum number of occurrences of an event allowed within a system for a given time period;
divide the given time period into a plurality of time intervals;
determine a number of occurrences of the event for individual ones of the plurality of time intervals;
determine a remaining budget amount at an end of the individual ones of the plurality of time intervals;
create a time series that illustrates the remaining budget amount at the end of the individual ones of the plurality of time intervals; and
perform one or more actions based on the time series.

12. The computer system of claim 11, wherein the event includes a website having a success rate below a predetermined percentage for a predetermined time.

13. The computer system of claim 11, wherein determining the budget amount includes calculating the budget amount based on a contracted rate for the given time period that is indicated within a service level objective (SLO).

14. The computer system of claim 11, wherein each of the plurality of time intervals has a same length.

15. The computer system of claim 11, wherein the one or more processors are further configured to determine a length of each of the plurality of time intervals based on historical data.

16. The computer system of claim 11, wherein the one or more processors are further configured to, during each of the plurality of time intervals:
receive a stream for an input metric;
compare values for the input metric to a threshold to determine an event count indicating a number of occurrences of the event within the system during the time interval; and
create the time series utilizing the event count for each interval within the given time period.

17. The computer system of claim 11, wherein the time series indicates a value for a remaining budget amount at an end of each time interval within the given time period.

18. The computer system of claim 11, wherein the one or more processors are further configured to issue one or more alerts based on the time series.

19. The computer system of claim 11, wherein the one or more processors are further configured to automatically implement one or more testing routines within the system based on the time series.

20. A non-transitory computer-readable medium storing a set of instructions, the set of instructions when executed by one or more processors cause processing to be performed comprising:
determining, by a computer system, a budget amount indicating a maximum number of occurrences of an event allowed within a system for a given time period;
dividing, by the computer system, the given time period into a plurality of time intervals;
determining, by the computer system, a number of occurrences of the event for individual ones of the plurality of time intervals;
determining, by the computer system, a remaining budget amount at an end of the individual ones of the plurality of time intervals;
creating, by the computer system, a time series that illustrates the remaining budget amount at the end of the individual ones of the plurality of time intervals; and
performing, by the computer system, one or more actions based on the time series.

* * * * *